United States Patent [19]

Lin

[11] Patent Number: 5,123,892
[45] Date of Patent: Jun. 23, 1992

[54] APPARATUS FOR RECEIVING CONFIDENTIAL FACSIMILE DOCUMENTS

[76] Inventor: Shao-Chia Lin, 6 Fl., No. 15-1, Sec. 2, Keelung Rd., Taipei, Taiwan

[21] Appl. No.: 706,048

[22] Filed: May 28, 1991

[51] Int. Cl.⁵ ............................................. B32B 31/02
[52] U.S. Cl. .................................... 493/394; 493/304; 493/435; 493/462; 156/218; 156/277; 156/358; 156/443
[58] Field of Search ............... 156/443, 465, 466, 203, 156/218, 277, 358; 358/403; 53/117; 270/32, 45, 10; 493/462, 304, 435, 394, 416

[56] References Cited

U.S. PATENT DOCUMENTS

| | | | |
|---|---|---|---|
| 4,917,662 | 4/1990 | Gombault | 493/462 X |
| 5,029,429 | 7/1991 | Noma et al. | 53/120 |

FOREIGN PATENT DOCUMENTS 50-37719  12/1975  Japan ................................. 156/218
58-142664  8/1983  Japan.

Primary Examiner—Michael W. Ball
Assistant Examiner—Michele K. Yoder
Attorney, Agent, or Firm—Allen, Dyer, Doppelt, Franjola & Milbrath

[57] ABSTRACT

An apparatus and method for receiving confidential facsimile messages includes a receiver to receive a sheet of facsimile paper having two margins each coated with a heat-molten adhesive strip and to form the sheet of facsimile paper into a paper roll, a first rolling means and a second rolling means to roll the paper flat, and a heating element to melt the heat-molten strip so that the margins are sealed.

14 Claims, 5 Drawing Sheets

APPARATUS FOR RECEIVING CONFIDENTIAL FACSIMILE DOCUMENTS

BACKGROUND OF THE INVENTION

The present invention relates to an apparatus and method for receiving confidential documents.

Conventionally, a facsimile machine prints each and every incoming message on a piece of paper upon arrival. The documents are open to everyone passing by the facsimile machine. Therefore, the intended receiver cannot be sure that he or she is the first one to read the incoming document.

Memory chips have been built into facsimile machines for storing and retrieving confidential messages. A first problem is that the memory chip quickly runs out of storage capacity. A second problem is that the memory chip is expensive, so that most families or small businesses cannot afford it. A third problem is that if power to the facsimile machine is interrupted, the messages stored in the memory will be lost. Although batteries can be used to solve this problem, batteries are an additional cost and have recharging problems of their own.

SUMMARY OF THE INVENTION

It is an object of the present invention to provide an apparatus and method for receiving printed confidential messages.

This and additional objects, if not set forth specifically herein, will be readily apparent to those skilled in the art from the detailed description of embodiments below, with reference of the accompanying drawings.

DESCRIPTION OF THE INVENTION

Figure 1:
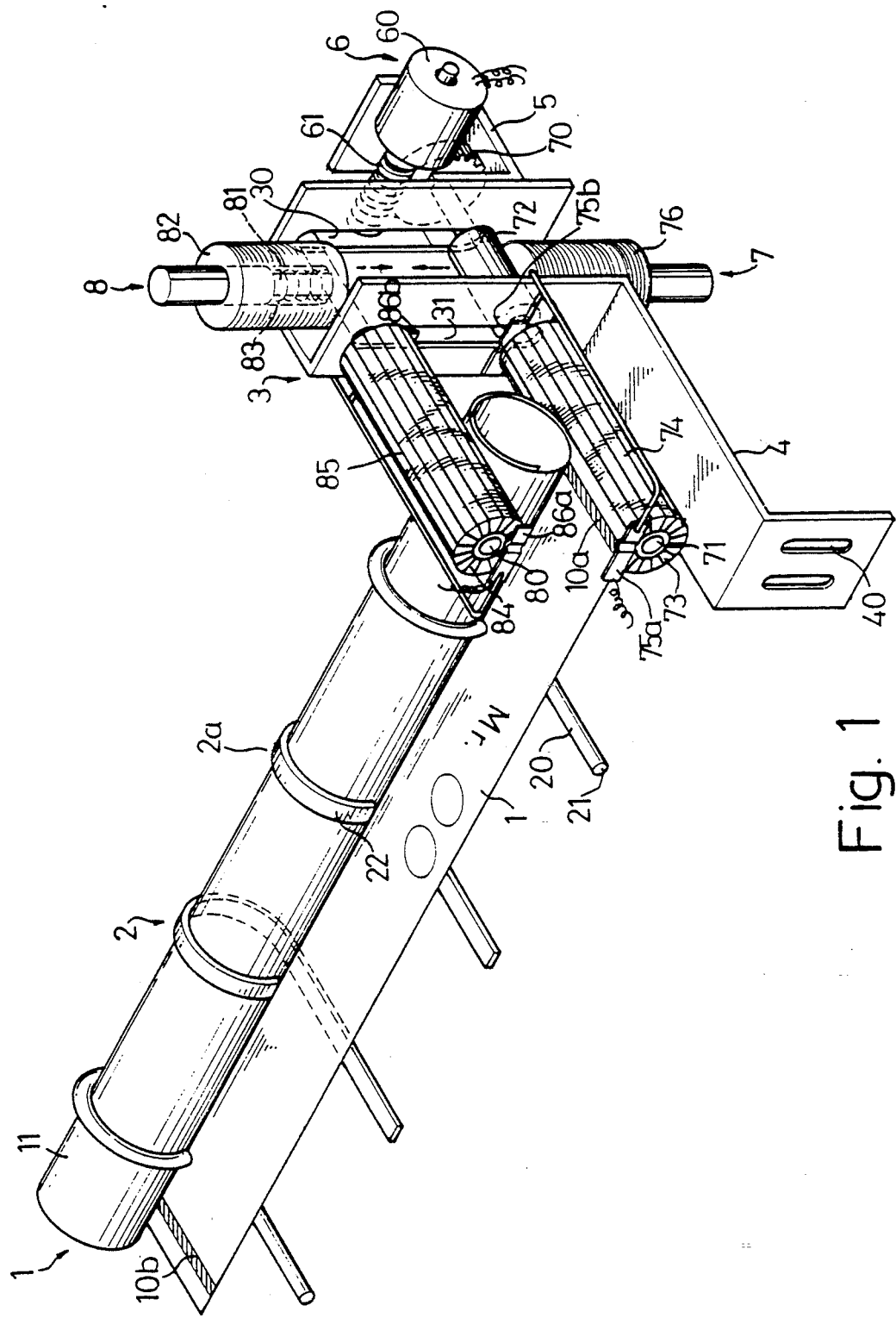
FIG. 1 is a perspective view of a preferred embodiment of the present invention, showing a paper roll in a position before being compressed flat.

Referring to FIG. 1, a sheet of facsimile paper 1 is received in a receiver 2. An apparatus for receiving confidential messages comprises the receiver 2, a frame 3, an arm 4, a shelf 5, a driving assembly 6, a first rolling assembly 7, and a second rolling assembly 8.

The sheet of facsimile paper 1 includes a surface coated with a heat-sensitive material which can be written on by an over-write head of a facsimile machine (not shown). The coated surface includes a first margin paved with a first strip of heat-molten adhesive material 10a and a second margin paved with a second strip of heat-molten adhesive material 10b. Perforation lines 11 and 11 are respectively formed next to the strips of heat-molten material 10a and 10b, such that the perforation lines 11 and 11 are respectively in parallel to the strips of heat-molten material 10a and 10b.

In a preferred embodiment of a receiver 2 of the present invention, a receiver 2a includes a plurality of parallel strips 20. Each strip 20 includes a first end 21 attachable to a facsimile machine (not shown) and a second bent end 22. The second end 22 is so shaped that the sheet of facsimile paper 1 is formed into a paper roll while being sent out by the facsimile machine.

Figure 2:
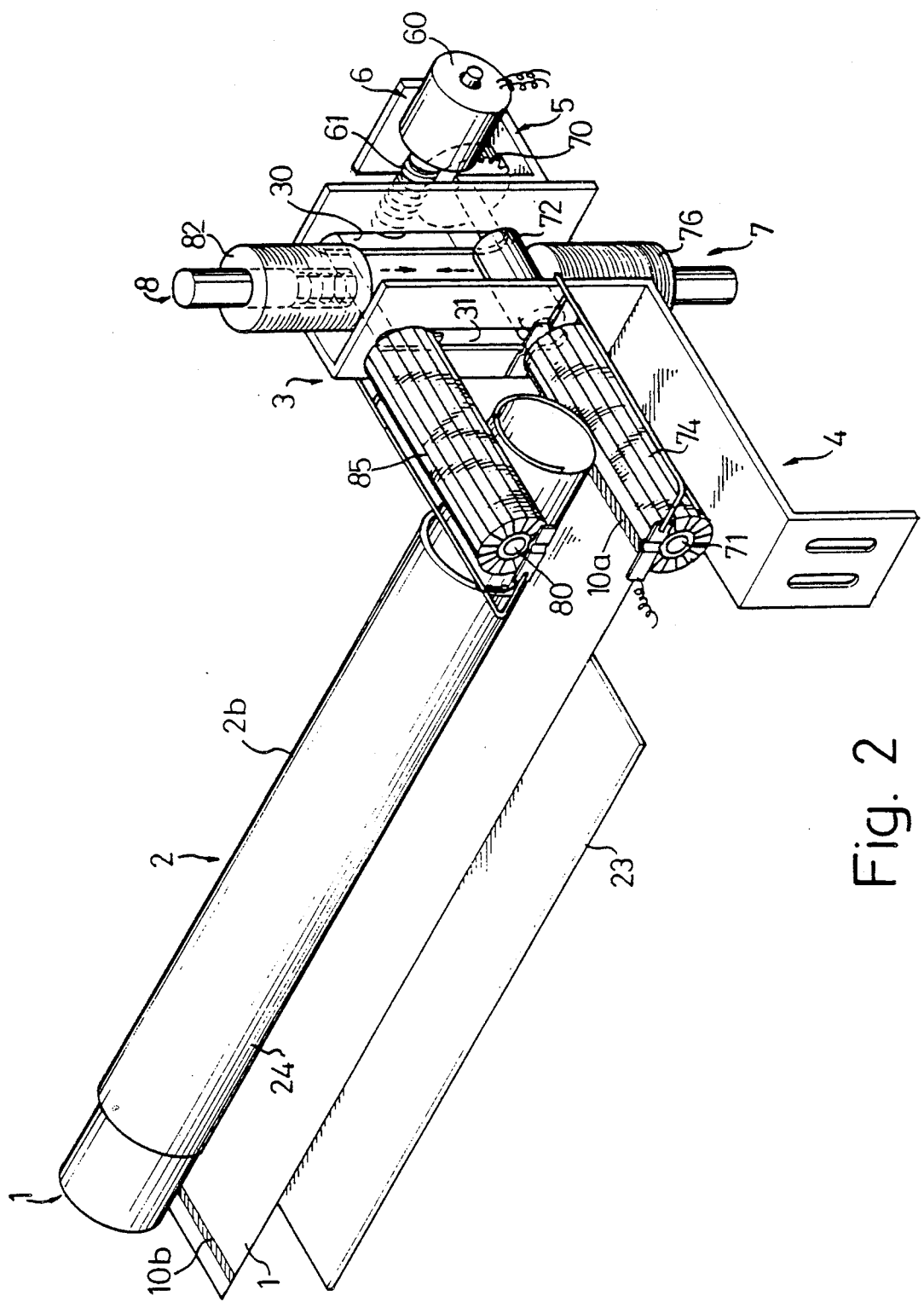
FIG. 2 is a perspective view of another preferred embodiment of the present invention.

Referring to FIG. 2, showing another preferred embodiment of the receiver 2, a receiver 2b includes a first rim 23 attachable to a facsimile machine and a second bent end 24. The second end 24 is so shaped that the sheet of facsimile paper 1 is formed into a paper roll while being sent out by the facsimile machine.

The frame 3 includes two opposite walls respectively formed with a slot 30 and a slot 31.

The arm 4 includes a first end fixed to the frame 3 and a second end formed with two slots 40 through which bolts are insertable, so that the whole apparatus is fixed to a table (not shown) on which the facsimile machine lies.

The shelf 5 includes an end fixed to the frame 3.

The driving assembly 6 is mounted on the shelf 5. The driving assembly 6 includes a motor 60 and a worm 61 axially and operatively fixed thereto.

The first rolling assembly 7 includes a worm gear 70 meshing with the worm 61, a shaft 71 co-axially fixed thereto and inserted through the slot 30, a bearing 72 and the slot 31, a roller 73 co-axially fixed to the shaft 70, a plurality of heating strips 74 paved on a surface of the roller 73, two tabs 75a and 75b, each slightly contacting and end of a heating strip 74, and a solenoid-and-core means 76 fixed beneath the bearing. Each heating strip 74 is parallel to the roller 73. When a current is applied from the tab 75a (or 75b) through the heating strip 74 to the tab 75b (or 75a), the heating strip 74 produces heat which melts the strips of heat-molten adhesive material 10a and 10b.

The second rolling assembly 8 is movably mounted above the first rolling assembly 7. The second rolling assembly 8 includes an axle 80 inserted through the slot 30 and the slot 31, a rod 81 transversely fixed thereto, a cylinder 82 fixed between the two opposite walls of the frame 3 for receiving the rod 81, a spring 83 connecting the rod 81 and the cylinder 82, a roller 84 axially and rotatably mounted on the shaft 80, a plurality of heating strips 85 attached to a surface of the roller 84, and two tabs 86a and 86b, each slightly contacting an end of a heating strip 85. Each heating strip 85 is parallel to the roller 84. When an instant current is applied from the tab 86a (or 86b) through the heating strip 85 to the tab 86b (or 86a), the heating strip 85 produces heat which melts the heat-molten adhesive material 10a and 10b.

Referring back to FIG. 1, the roller 84 is in a distal position from the roller 73, such that the first margin 10a of the paper roll can be disposed therebetween. When the sheet of facsimile paper 1 is sent out from the facsimile machine, it is formed into a paper roll by means of the bent ends 22 (or in the other embodiment, by means of the bent rim 24), while the head, on which a name of the intended receiver is printed, of the sheet of facsimile paper 1 is open and able to be viewed by anyone.

Figure 3:
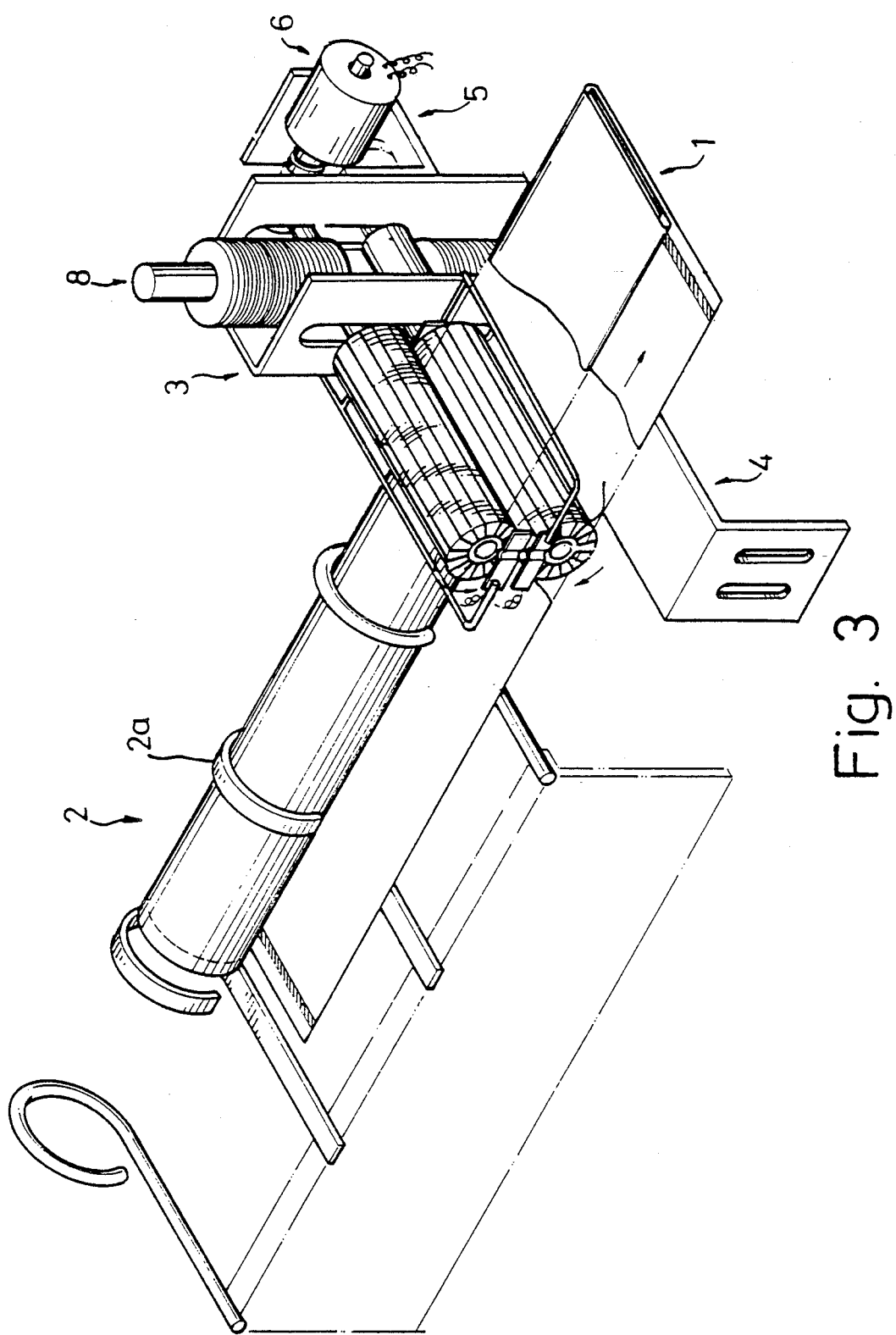
FIG. 3 is a perspective view of the embodiment of FIG. 1, showing a paper roll in a position of being compressed.
Figure 4:
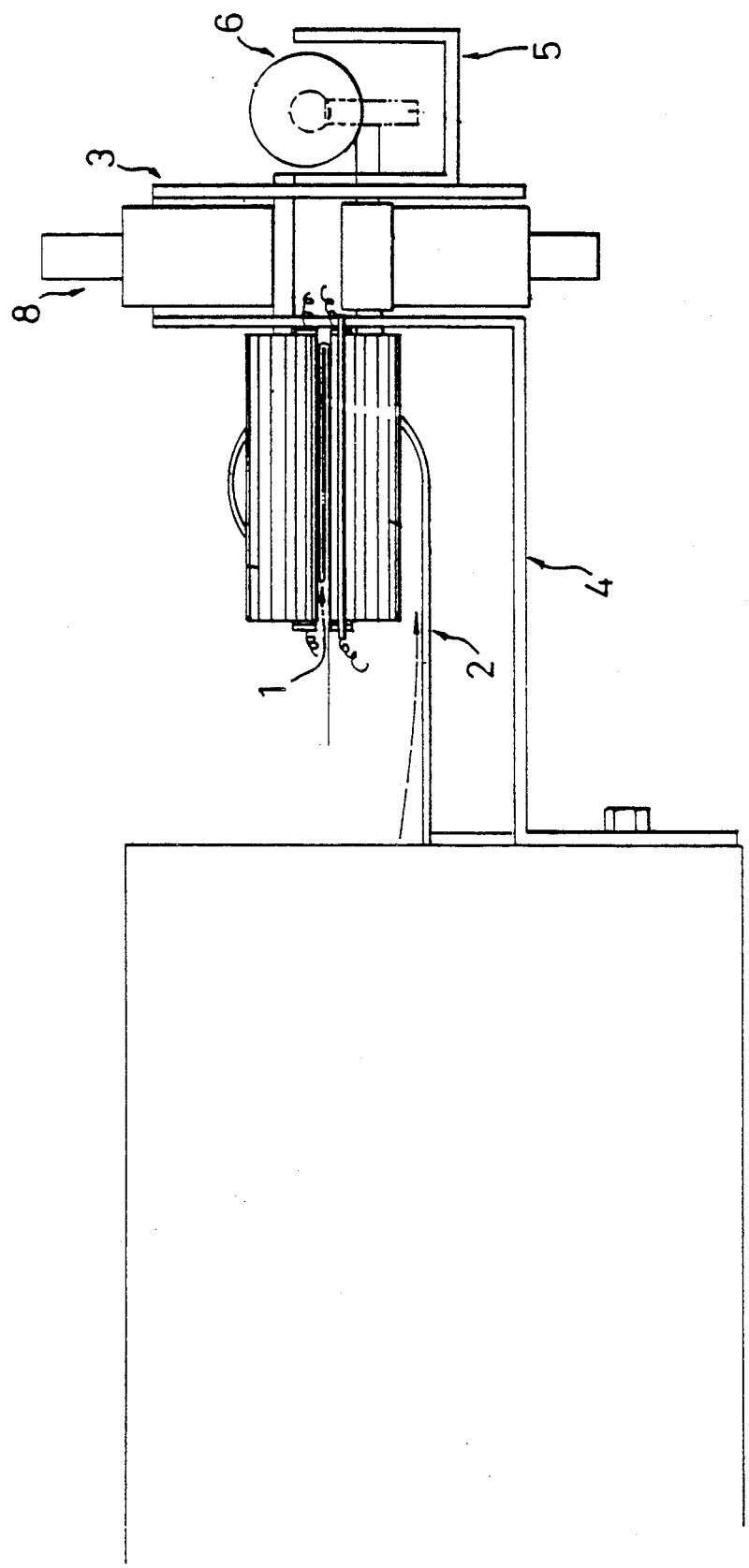
FIG. 4 is a side view of the preferred embodiment of the present invention, showing motion thereof.

Referring to FIGS. 3 and 4, by means of a controlling circuit (not shown), the solenoid is actuated to cause a magnetic field which is adequately strong to attract the second rolling assembly downward, so as to act as a compressing means, so that the roller 85 is in a proximate position to the roller 74 while the spring 83 is biased. As a result, the paper roll is cramped between the rollers 74 and 85. Then, a current is directed through the strip 74 that is beneath the strip of heat-molten material 10a, while another current is directed through the strip 85 that is above the strip of heat-molten material 10a. The rollers 74 and 85 respectively produce heat to melt the heat-molten material so that the first margin of the paper roll is sealed.

The motor 60 is then actuated. By means of the worm 61, the meshing worm gear 70, and the shaft 71, the roller 74 is rotated, so that the roller 85 is also rotated while the paper roll is being rolled to be flat.

When the strip of heat-molten adhesive material 10b arrives at a position between the rollers 74 and 85, the motor 60 is paused. The strip of heat-molten adhesive material 10b is then processed in a similar manner to the heat-molten adhesive material 10a. After that, the compressed paper roll is sent out of the apparatus. The solenoid is turned off and the second rolling assembly 8 is released from the magnetic field. As a result, the second rolling assembly 8 is back to the position distal from the first rolling assembly 7 by means of the biased spring 83.

Figure 5:
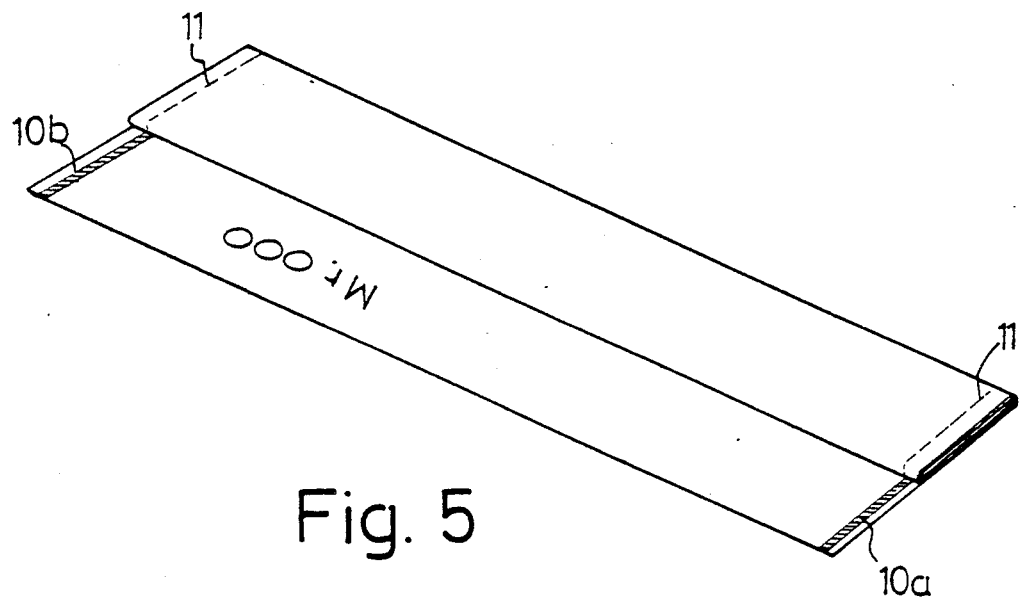
FIGS. 5 and 6 are views of compressed paper rolls.
Figure 6:
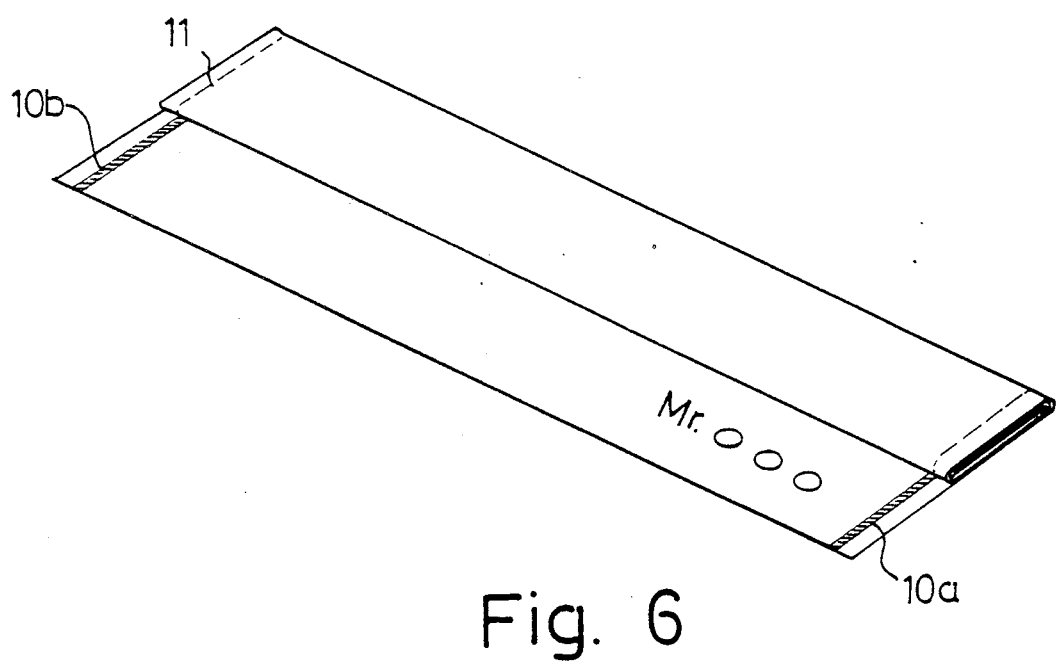

Referring to FIGS. 5 and 6, the name of the intended receiver is written on the portion which is last printed and sent out by the facsimile machine, such that it can be known who the intended receiver is.

While the present invention has been explained in relation to its preferred embodiment, it is to be understood that various variations thereof will be apparent to those skilled in the art upon reading this specification. Therefore, the invention disclosed herein is intended to cover all such variations as shall fall within the scope of the appended claims.

What I claim is:

1. An apparatus for receiving and securing confidential facsimile messages exiting a conventional facsimile machine, said apparatus being attached to the facsimile machine and communicating with a control circuit, comprising:
   sealable paper comprising facsimile paper and adhesion means for providing adhesion for said sealable paper;
   receiving means for receiving said sealable paper from the facsimile machine and rolling said sealable paper into a tubular roll; and
   sealing means for sealing said sealable paper.

2. The apparatus as claimed in claim 1, wherein said receiving means comprises a plurality of members, each said member has a curved end distal to the facsimile machine, said curved ends curve back around toward said member in a cylindrical fashion, so that when said sealable paper exits the facsimile machine, said members receive said sealable paper and said curved ends urge said sealable paper into a tubular roll.

3. The apparatus as claimed in claim 1, wherein said receiving means comprises a receiving plate, said receiving plate has a tubular end distal to the facsimile machine, so that when said sealable paper exits the facsimile machine, said receiving plate receives said sealable paper and said tubular end urges said sealable paper into a tubular roll.

4. The apparatus as claimed in claim 1, wherein said sealing means comprises:
   rolling means for receiving said tubular roll from said receiving means, compressing and flattening said tubular roll, and conveying said flattened roll; and
   actuating means for actuating said rolling means.

5. The apparatus as claimed in claim 4, wherein said rolling means comprises a pair of rollers in a parallel spaced relationship and compressing means for moving said rollers to compress said tubular roll, so that when said actuating means actuates said rolling means, said compressing means move said rollers together, thereby compressing and sealing said tubular roll with said adhesion means therebetween, and said rollers rotate in counterdirections, thereby conveying said flattened roll therebetween.

6. The apparatus as claimed in claim 5, wherein said compressing means comprises a pair of electromagnets disposed in an opposing distal relationship on said rollers.

7. The apparatus as claimed in claim 5, wherein said actuating means comprises a motor and a worm gear, said motor communicates with said worm gear and said worm gear communicates with said rolling means.

8. The apparatus as claimed in claim 1, wherein said adhesion means comprises on one side of the facsimile paper a pair of heat-molten strips, one said strip is coated along one edge of said sealable paper, the other said strip is coated along the other edge of said sealable paper and said sealing means comprises heating means for heating said strips.

9. The apparatus as claimed in claim 8, wherein said sealing means further comprises:
   rolling means for receiving said tubular roll from said receiving means, compressing said tubular roll, and conveying said tubular roll; and
   actuating means for actuating said rolling means.

10. The apparatus as claimed in claim 9, wherein said rolling means comprises a pair of rollers in a parallel spaced relationship and compressing means for moving said rollers to compress said tubular roll, so that when said actuating means actuates said rolling means, said compressing means move said rollers together, thereby compressing said tubular roll therebetween, and said rollers rotate in counterdirections, thereby conveying said flattened roll therebetween.

11. The apparatus as claimed in claim 10, wherein said compressing means comprises a pair of electromagnets disposed in an opposing distal relationship on said rollers.

12. The apparatus as claimed in claim 10, wherein said actuating means comprises a motor and a worm gear, said motor communicates with said worm gear and said worm gear communicates with said rolling means.

13. The apparatus as claimed in claim 10, wherein said heating means comprises at least one heating element disposed flush in each said roller along a length thereof and conducting means for introducing current into said heating elements, so that when said compressing means moves said rollers together, compressing said tubular roll therebetween, one of said strips of said tubular roll is positioned between a pair of said heating elements, and said conducting means introduces a current therein, thereby melting said strip and adhering said strip to the other side of the facsimile paper, and so that when said rollers convey said tubular roll, simultaneously compressing said tubular roll, until the other said strip is positioned between a pair of said heating elements, and said conducting means introduces a current therein, thereby melting said strip and adhering said strip to the other side of the facsimile paper.

14. The apparatus as claimed in claim 13, wherein said conducting means comprises two pairs of tabs so that when said heat-molten strip is disposed between said pair of heating elements, each said pair of tabs contacts respective ends of one of said heating elements of said pair of heating elements for conducting a current therethrough, thereby melting said strips.

* * * * *